Nov. 27, 1951

G. M. ACTON 2,576,874

BEVERAGE AND FOOD CABINET WITH
A HEATING ELEMENT THEREIN

Filed July 28, 1950

Inventor
Grant M. Acton
By
Fishburn & Mullendore
Attorneys

Nov. 27, 1951 — G. M. ACTON — 2,576,874
BEVERAGE AND FOOD CABINET WITH A HEATING ELEMENT THEREIN
Filed July 28, 1950 — 2 SHEETS—SHEET 2
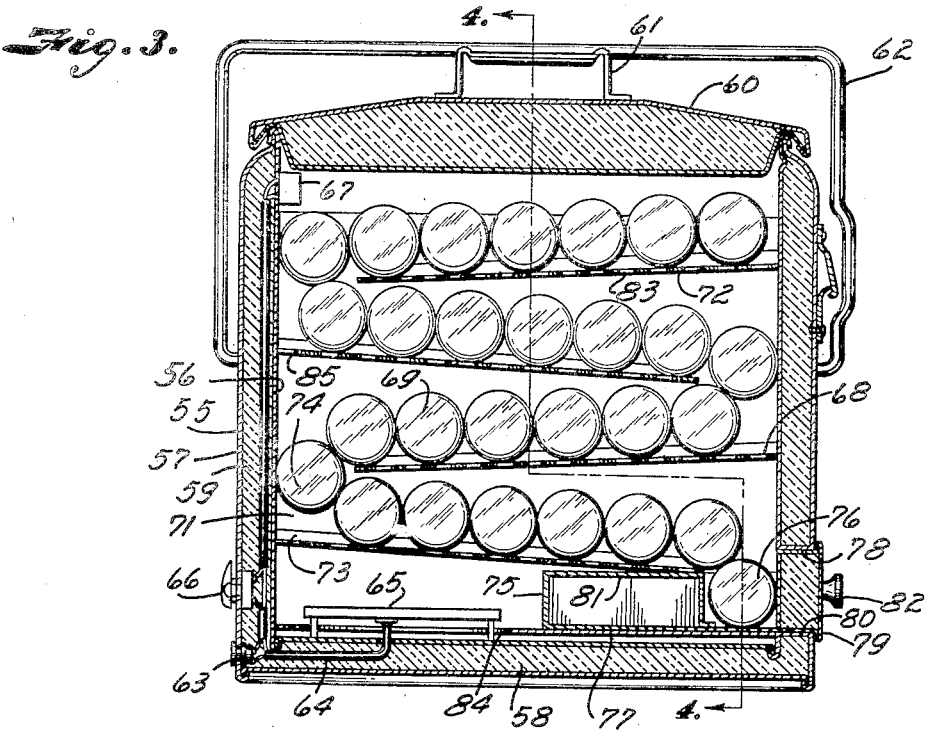
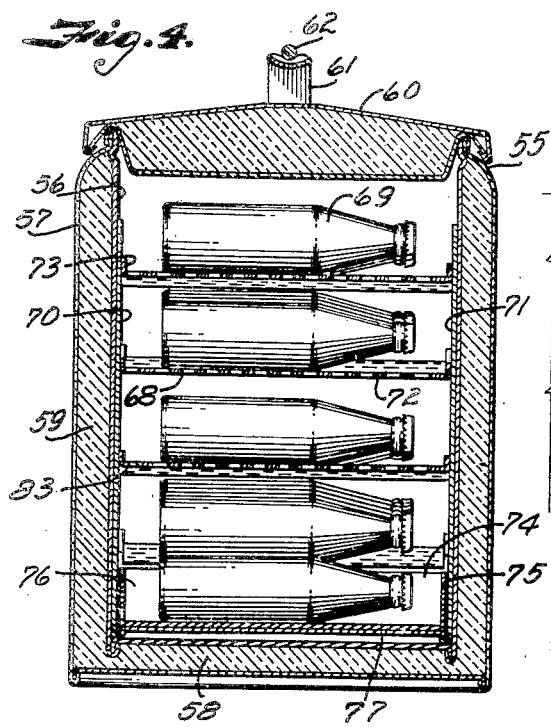
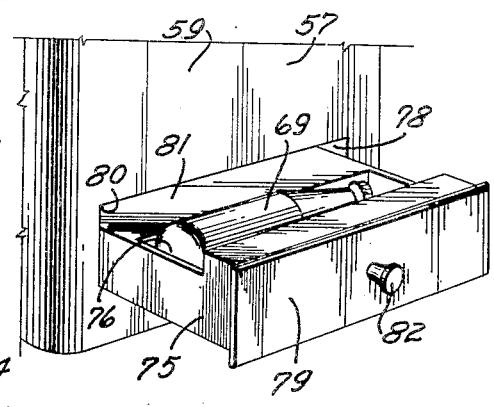
Inventor
Grant M. Acton
By Fishburn & Mullendore
Attorneys Patented Nov. 27, 1951

2,576,874

UNITED STATES PATENT OFFICE 2,576,874

BEVERAGE AND FOOD CABINET WITH A HEATING ELEMENT THEREIN

Grant M. Acton, Arkansas City, Kans., assignor to Acton Products, Inc., Arkansas City, Kans., a corporation of Kansas Application July 28, 1950, Serial No. 176,455

5 Claims. (Cl. 219—19)

This invention relates to portable beverage and food cabinets and more particularly to such a cabinet or container that is insulated and adapted to keep the contents either hot or cold.

The objects of the present invention are to provide a portable cabinet having heavily insulated walls, bottom and removable cover, the walls of which include an inner-liner forming a watertight ice container adapted to contain ice or the like for cooling the contents of the cabinet; to provide a portable cabinet having spaced inner and outer shells with insulation therebetween, with a heating device in the walls spaced from the inner shell and insulated from the outer shell for heating the contents of the cabinet; to provide controls for the heating device for selectively heating the contents of the cabinet and regulating the temperature thereof; to provide an arrangement of cabinet heating device whereby ice and water may be contained in the cabinet interior without damage or other effect on the heating device; to provide a portable insulated cabinet which may be selectively used for maintaining food and beverages at either hot or cold temperatures; to provide for delivery of items from the cabinet one at a time; to provide a rack in the cabinet which feeds the contained items from the top to the bottom of the cabinet by gravity and cooperates with the delivery device to limit the quantity delivered upon each operation thereof; and to provide a portable cabinet of the character described that is neat and attractive in appearance, durable and sturdily built to withstand rough treatment instant to transportation abuses, yet inexpensive, light in weight, and convenient to use for containing food and beverages at desired temperature conditions.

In accomplishing these and other objects of the present invention, I have provided improved details of structure the preferred forms of which are illustrated in the accompanying drawings wherein:

Fig. 3 is a longitudinal sectional view through a modified form of cabinet with a rack and delivery device for delivering the contained items from adjacent the bottom of the cabinet.

Fig. 4 is a transverse sectional view through the cabinet on the line 4—4, Fig. 3.

Fig. 5 is a partial perspective view of the cabinet delivery device.

Figure 1:
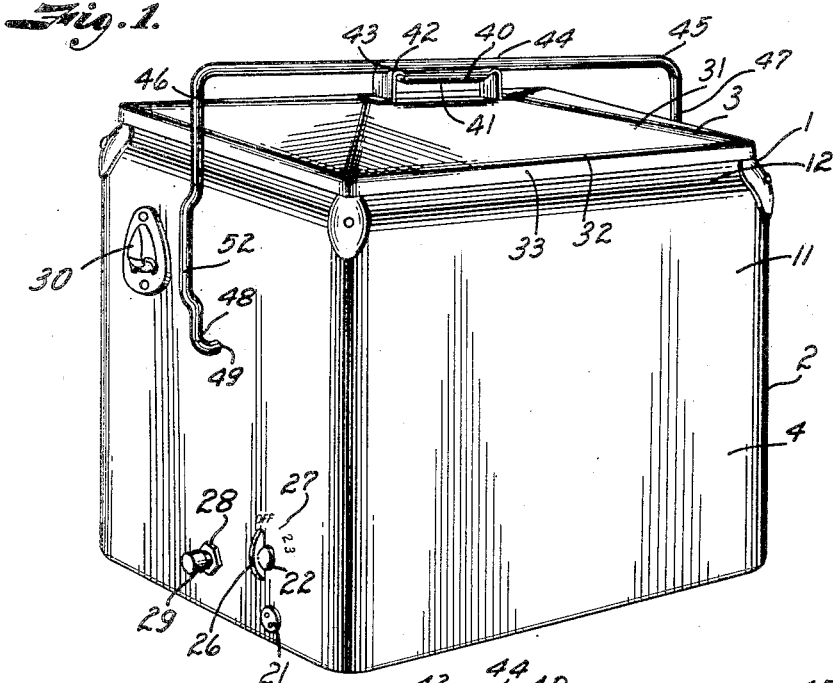
Fig. 1 is a perspective view of a portable food and beverage cooler embodying the features of the present invention.

Referring more in detail to the drawings:

1 designates a portable beverage and food cabinet consisting of an open top box 2 and cover 3 therefor. The cabinet box preferably consists of spaced outer and inner shells 4 and 5 respectively, preferably of sheet metal, the inner shell being of corrosive-resistant material such as stainless steel, aluminum or steel coated with anticorrosion material. The inner shell consists of a bottom 6, suitably secured as at 7 to the lower end of upwardly extending walls 8 to provide a watertight compartment. The upper edges of the walls 8 terminate in outwardly and downwardly turned edges 9 which extend over and form a locked joint with an upstanding portion 10 at the upper edge of walls 11 of the outer shell 4. The portion of the walls 11 adjacent the upstanding edge 10 is curved outwardly as at 12 whereby the walls 8 and 11 are spaced as at 13.

The outer shell 4 includes a bottom 14 spaced below the bottom 6 as at 15 and having its edges secured as at 16 adjacent the lower edge of the walls 11. It is preferable that the various portions of the inner and outer shells be connected by lock joints, welding and/or otherwise sealed to form a durable watertight structure. Insulation, such as glass wool or the like 17, substantially fills the space 13 between the walls 8 and 11 and is also arranged in the space 15 between the bottoms 6 and 14, however, it is preferable that the insulation in the space 15 rest on the bottom 14 and be of less thickness than the spacing whereby the upper surface 18 of the insulation is spaced as at 19 from the bottom 6 of the inner shell.

An electric heating element 20 is arranged between the bottoms 6 and 14, preferably resting on the upper surface 18 of the insulation and spaced from the bottom 6, whereby when the heating element is energized the heat thereof will be radiated through the air space and provide a substantially even heat on the bottom 6 of the inner shell and not create any hot spots therein. To further aid in the even heating, it is preferable that the heating element include a relatively large area with respect to the bottom 6.

An electrical connector 21, preferably a female plug, is suitably mounted in the wall of the outer shell 4 and adapted to receive a male plug suitably connected with a source of electrical energy for energizing the heating element 20. A switch 22 and an adjustable thermostat 23 are electrically connected in the heating element circuit for controlling same to maintain desired temperatures in the cabinet.

The thermostat 23 is preferably mounted on the inside of the wall 8 of the inner shell 5 adjacent the upper end thereof. The thermostat is the only portion of the electrical apparatus inside of the inner shell, the conduit 24 leading to and from said thermostat extending through suitable apertures in the wall 8 and downwardly through the insulation 17 between the walls 8 and 11. The switch 22 is preferably of the multiple-pole or three way type, having suitable resistances connected therewith for regulating the amount of electrical energy delivered to the heating element. It is preferable that the switch be such as to provide an off position and low, medium and high heat positions, said switch being mounted between the walls 8 and 11 and having a shaft 25 extending outwardly through the wall 11 for mounting a control knob 26 thereon, indicia 27 being embossed or otherwise applied to the outer surface of the wall 11 to indicate the position of the switch contacts. With this arrangement of the switch and thermostat in the heating element circuit the switch controls the energization of the heating element and provides a variation in the heat delivered to the interior of the cabinet. The thermostat is adjusted to a desired maximum temperature with the contacts thereof arranged to provide a desired range of temperatures whereby the temperature inside of the cabinet reaches a predetermined maximum, the thermostat will interrupt the circuit to the heating element then when the temperature falls to a predetermined minimum the thermostat will again make the circuit to the heating element for further heating of the interior of said cabinet.

The cabinet preferably is provided with a tubular drain 28 located adjacent the bottom of the inner shell and passing through the two shell walls 8 and 11, said drain fitting being suitably mounted in the walls to provide a leak proof joint with the inner shell. The outer end of the tubular drain is preferably provided with a cap 29 to close and seal the drain. A crown cap remover 30 is preferably mounted on the wall 11 of the outer shell 4 in a suitable position for removing caps from bottles of beverage after same have been removed from the cabinet.

The cabinet cover 3 is preferably formed of an outer member 31 shaped to form a crowned appearance, the sides and ends being turned downwardly as at 32 to form side and end edges 33 of the cover. The lower portion of the sides and ends of the cover being turned upwardly as at 34 forming a channel therearound in which is snugly received curved upper edges 35 of an inner liner 36. The curved edges 35 of the inner liner engage the inner surfaces of the outer member 31 and have inwardly directed sloping walls 37 terminating in a flat portion 38 spaced from the outer member 31, said spacing being filled with insulating material 39. The inwardly sloping edges of the cover inner liner are of such size that the lower portion of the liner freely fits into the opening surrounded by the upstanding rib formed by the upper edges of the inner shell 5. The upper portion of the liner member is slightly larger than the inner dimensions of the rib whereby the sloping portions engage said rib to form a seal for closing the open upper end of the cabinet box, while the lower portion of the sides and ends 33 of the cover are spaced from the upper rounded end of the outer shell 4.

The outer member 31 of the cabinet cover is preferably provided with a handle 40, the ends of which are turned downwardly and outwardly to rest on the outer member 31, said ends being suitably secured by screws or the like to provide a secure solid mounting of the handles on the outer member 31. The intermediate handle portion between the downturned ends is slightly concave longitudinally as indicated at 41 to provide a sheet metal handle portion shaped to comfortably fit the hand while carrying the cabinet. The upper edges of the handle adjacent to the ends thereof are preferably curved as at 42 and provided with a seat 43 to receive the central portion 44 of a bail 45. The ends or legs 46 and 47 of said bail being parallel and positioned close to the end walls of the cabinet box. The lower ends 48 of the legs 46 and 47 are turned inwardly toward each other and are pivotally seated in holes 49 in the walls of the outer shell of the cabinet. To reinforce the inner and outer shells adjacent to pivotal connections of the bail, a block of wood or other suitable material 50 is secured to the walls 8 and 11 by suitable adhesive or the like, said blocks having holes 51 aligning with the holes 49 to receive the ends 48 of the bail. The bail is adapted for a swinging movement to engage the curved portion 42 of the handle and spring upwardly over the edge thereon and drop or spring into the seat 43 to tighten the cabinet cover in place on the cabinet box. The leg 46 of the bail is preferably curved outwardly as at 52 to permit the bail to swing past the crown opener 30.

In using a cabinet constructed as described for refrigeration purposes, the bail is pushed to one side and over the side edge of the cover whereby the handle 40 may be grasped to lift the cover from the cabinet box. The cap 29 is then tightened on the drain tube 28 and a suitable quantity of ice is placed in the lower portion of the cabinet box and arranged on the bottom 6 of the inner shell whereby bottled beverage and other articles adapted for placing on ice may be arranged in the interior of the cabinet to obtain full benefit of the refrigeration of the ice therein. Food may be placed in suitable containers, trays, or shelves, and arranged in the interior of the cabinet above the beverages and ice in the lower portion thereof. The cover is then lifted by the handle 40 and placed on the box in seating engagement with the rib around the opening of the cabinet box to close same. The bail is then swung upwardly over the cover to engage the handle and move over the edges thereof to drop in the seat 43 providing spring pressure forcing the sloping edges of the cover liner into sealing engagement with the rib on the cabinet box to seal the interior of said box, said bail securely locking the cover in place.

The portable cover is then ready for transportation to a point of use and may be lifted either by the handle 40 or bail 45 as desired. If too much water has collected in the bottom of the inner shell, the cap 29 may be removed from the tubular drain member to allow a portion of the water to drain from the cabinet, said cap being replaced to prevent any water from draining into a car or other means of transportation in which said cabinet may be placed.

When it is desired to use any of the contents of the cabinet, the bail is swung from engagement with the handle and over the side of the cabinet whereby the cover may be lifted to expose the contents of the cabinet.

When it is desired to use the cabinet for heating the contents thereof, as, for example, in cold climates where there is danger of foods and beverages freezing, it may be desired to heat the interior of the cabinet and maintain same slightly above freezing, but allow the interior to be of low enough temperature to preserve the foods and beverages contained therein. Also the cabinet may be used to apply heat to foods and beverages to keep same warm, for example, up to 150° F. Any water in the interior of the cabinet may be drained or otherwise emptied or can be left in the cabinet depending upon the type of food containers to be used in the cabinet. The cover is removed from the cabinet box as above described and food and beverages as desired may be placed into the interior of the cabinet box. The thermostat is then adjusted to a desired maximum temperature, the cover replaced, and the electric connector 21 connected to a suitable source of electric energy. The switch 22 is then turned to engage desired contacts for low, medium or high heat effecting energization of the heating element whereby the heat therefrom heats the air in the space 19 and transmits said heat through the entire bottom member 6 of the inner shell substantially uniformly which heat is in turn radiated into the interior of the inner shell. The range of the temperature in the interior of the cabinet is then controlled by the thermostat 23, in accordance with the adjustment previously made. The spacing of the heating element from the bottom member 6 prevents any extreme hot spots in said bottom and tends to distribute the heat uniformly through the box, also, some of the heat is conducted from the bottom 6 upwardly through the walls 8 of the inner shell for radiation into the upper portions of the cabinet interior. When it is desired to remove any of the contents of the cabinet, the cover is removed as above described providing access to the interior thereof.

The modified form of the invention, as illustrated in Figs. 3 to 5 inclusive, is generally the same as the structure illustrated in Figs. 1 and 2, therefore, only the differences will be described.

The modified form of the invention is particularly adapted for heating and dispensing bottled beverages, the bottles preferably removed one at a time from adjacent the bottom of the cabinet and the remaining bottles in the cabinet being moved downwardly in the cabinet under the influence of gravity. The cabinet box 55 has inner and outer shells 56 and 57 with insulation therebetween to provide and insulated bottom 58 and upwardly extending insulated walls 59. Removably mounted on the upper ends of the insulated walls 59 for closing the opening formed thereby is an insulated cover 60 having a handle 61, adapted to be engaged by a bail 62 pivotally mounted on the walls 59 as described in the structure illustrated in Figs. 1 and 2. The cabinet is provided with an electrical connector 63 adapted to be connected with a suitable source of electric energy and having connection by conduit 64 with a heating element 65 suitably mounted in the interior of cabinet, adjacent the bottom thereof. Connected in the electric circuit to the heating element, is a switch 66 preferably of the low, medium and high heat type for controlling energization of the heating element. Also connected in the electric circuit is a thermostat 67 suitably mounted inside of the cabinet box preferably in the upper portion thereof, said thermostat being adjustable to substantially maintain desired temperature in the interior of the cabinet.

A rack 68 adapted to carry bottles 69 of beverage is removably mounted in the interior of the cabinet, said rack having spaced vertical walls 70 and 71 which support a plurality of baffles or ramps 72. The baffles 72 span the space between the walls 70 and 71 and have sides suitably secured thereto, for example, the side edges of the baffle are bent to form flanges 73 which are secured as by welding or the like to the walls 70 and 71. The baffles each slope downwardly and are vertically spaced with one end of alternate baffles substantially engaging one wall of the cabinet and the other end of said alternate baffles being spaced from the opposite wall to form an opening 74 whereby the bottles 69 will move under the influence of gravity down one baffle through the opening 74 and down the next lower baffle which is sloped in the opposite direction through another opening 74 to the next baffle and so on throughout the height of the rack.

The lowermost baffle is spaced above the bottom wall of the cabinet sufficiently to accommodate a dispensing tray 75 therebetween, said tray preferably being disposed oppositely to the heating element 65 and having a receptacle 76 adjacent the wall of the cabinet and in alignment with the opening 74 formed by the spacing between the end of the lowermost baffle and said wall. The tray 75 is slidably mounted on a panel 77 having sides connected to the walls 70 and 71 adapted to align with the bottom of an opening 78 in the cabinet wall adjacent to receptacle 76. The tray is provided with an end member 79 which is insulated and adapted to substantially close the opening 80 in the cabinet wall. The tray 75 is provided with a top wall 81 extending from the receptacle 76 inwardly into the cabinet whereby the tray may be pulled outwardly by a handle 82 sufficiently to provide access to the receptacle 76 for removal of a bottle 69 of beverage and the panel 81 be in position to close the opening between the lowermost baffle and the adjacent wall 59 of the cabinet to prevent movement of bottles in the cabinet during the dispensing operation. When the tray is pushed into the cabinet to again align the receptacle with the opening formed by the baffle, the next bottle will move into the receptacle and all the bottles in the cabinet will move downwardly on the rack. Each of the baffles are preferably perforated as at 83 and the panel 77 is provided with an aperture 84 whereby heat from the heating element 65 can move upwardly through the baffles and around the bottles carried thereby. Also the baffles are provided with openings 85 which align with the thermostat 67 whereby the rack may be removed from the cabinet without disturbing the thermostat. The arrangement of the dispensing tray is such that the rack cannot be removed from the cabinet until the tray is removed, but upon removal of said tray, the rack may be grasped and lifted from the cabinet through the open top thereof.

Figure 2:
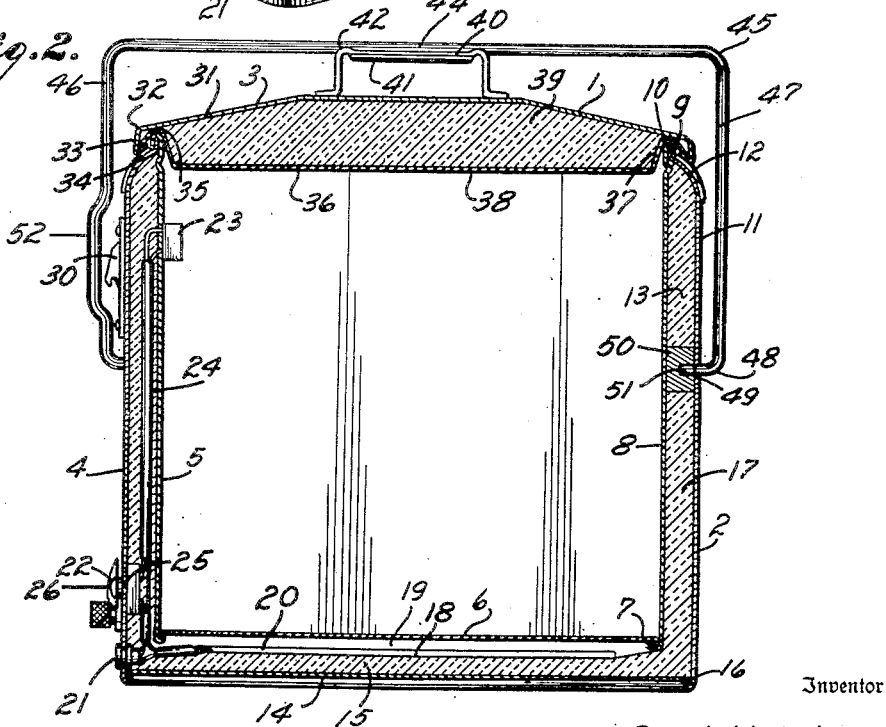
Fig. 2 is a longitudinal sectional view through the cabinet.

The cabinet is serviced by removing the cover as described relative to the structure shown in Figs. 1 and 2, and bottles of beverage placed on the baffles of the rack, said bottles moving by influence of gravity downwardly through the cabinet to position for moving into the receptacle 76 of the dispensing tray for dispensing the bottles of beverage one at a time. Also the beverage in the bottles is gradually heated whereby in normal operation there will be sufficient time before a bottle has progressed the full distance from top to bottom of the cabinet for the beverage to reach the desired temperature.

It is believed obvious that I have provided a portable food and beverage cabinet structure of light weight, sturdy construction, capable of withstanding the abuses of the transportation, and adapted to be used for maintaining the contents of the cabinet at desired condition of hot or cold temperatures, and also provide for dispensing hot beverages in bottles one at a time.

What I claim and desire to secure by Letters Patent is:

1. A portable cabinet for use in maintaining food and bottled beverages hot or cold comprising, inner and outer shells each having side, end and bottom walls, respective walls of said shells being spaced apart, insulation in the spacing between the respective side and end walls, insulation on the interior of the bottom wall of the outer shell and spaced from the bottom of the inner shell, interlocking flanges on the upper ends of the respective side and end walls of the shells to form a box having an open top, the inner shell of said box being adapted to contain ice and bottled beverages therein, an insulated cover having marginal portions overlying and adapted to seat on the walls for closing and sealing the box opening, means on the box engageable with the cover for removably securing same in sealing engagement with the walls, an electric heating element in the space between the bottom of the inner shell and the insulation on the bottom of the outer shell, said electric heating element being spaced from the bottom of the inner shell, an electric circuit including means for connecting the heating element with the source of electric energy, and a switch for controlling the electric circuit for regulating the energization of the heating element.

2. A portable cabinet for use in maintaining food and bottled beverages hot or cold comprising, inner and outer shells each having side, end and bottom walls, respective walls of said shells being spaced apart, insulation in the spacing between the respective side, end and bottom walls, interlocking flanges on the upper ends of the respective side and end walls of the shells to form a box having an open top, the inner shell of said box being adapted to contain ice and bottled beverages therein, an insulated cover having marginal portions overlying and adapted to seat on the walls for closing and sealing the box opening, means on the box engageable with the cover for removably securing same in sealing engagement with the walls, an electric heating element in the space between the bottom of the inner shell and the bottom of the outer shell, an electric circuit including means for connecting the heating element with the source of electric energy, means mounted on the inner shell inside of the box and responsive to the temperature inside of the box and electrically connected in the electric circuit for controlling energization of the heating element for regulating the temperature inside of the box.

3. A portable cabinet for use in maintaining food and bottled beverages hot or cold comprising, inner and outer shells each having side, end and bottom walls, respective walls of said shells being spaced apart, insulation in the spacing between the respective side and end walls, insulation on the interior of the bottom wall of the outer shell and spaced from the bottom of the inner shell, interlocking flanges on the upper ends of the respective side and end walls of the shells to form a box having an open top, the inner shell of said box being adapted to contain ice and bottled beverages therein, an insulated cover having marginal portions overlying and adapted to seat on the walls for closing and sealing the box opening, means on the box engageable with the cover for removably securing same in sealing engagement with the walls, an electric heating element in the space between the bottom of the inner shell and the insulation on the bottom of the outer shell, said electric heating element being spaced from the bottom of the inner shell, an electric circuit including means for connecting the heating element with the source of electric energy, a thermostat mounted on the inner shell inside of the box and responsive to the temperature inside of the box and electrically connected in the electric circuit for controlling energization of the heating element for regulating the temperature inside of the box.

4. A portable cabinet for use in maintaining food and bottled beverages hot or cold comprising, inner and outer shells each having side, end and bottom walls, respective walls of said shells being spaced apart, insulation in the spacing between the respective side and end walls, insulation on the interior of the bottom wall of the outer shell and spaced from the bottom of the inner shell, interlocking flanges on the upper ends of the respective side and end walls of the shells to form a box having an open top, the inner shell of said box being adapted to contain ice and bottled beverages therein, an insulated cover having marginal portions overlying and adapted to seat on the walls for closing and sealing the box opening, a handle centrally mounted on the top of the cover, said handle having a seat longitudinally thereof, a bail pivotally carried by the end walls of the box, and being engageable with and receivable in the longitudinal seat in the handle for applying pressure to the cover for removably securing same in sealing engagement with the walls, an electric heating element in the space between the bottom of the inner shell and the insulation on the bottom of the outer shell, said electric heating element being spaced from the bottom of the inner shell, an electric circuit including means for connecting the heating element with the source of electric energy, a switch for controlling the electric circuit, a thermostat mounted on the inner shell inside of the box adjacent the open end thereof and responsive to the temperature inside of the box and electrically connected in the electric circuit for controlling energization of the heating element for regulating the temperature inside of the box.

5. A portable cabinet for use in maintaining food and bottled beverages hot or cold comprising, inner and outer shells each having side, end and bottom walls, respective walls of said shells being spaced apart, insulation in the spacing between the respective side, end and bottom walls, the upper ends of the respective side and end walls of said shells being connected to form a box having an open top, the inner shell of said box being adapted to contain ice and bottled beverages therein, an insulated cover having marginal portions adapted to seat on the walls for closing and sealing the box opening, an electric heating element in the space between the bottom of the inner shell and the bottom of the outer shell, an electric circuit including means for connecting the heating element with a source of electric energy, and a switch for controlling the electric circuit for regulating the energization of the heating element.

GRANT M. ACTON.

REFERENCES CITED

The following references are of record in the file of this patent:

UNITED STATES PATENTS

| Number | Name | Date |
|---|---|---|
| 344,792 | Steich | June 29, 1886 |
| 951,323 | Mathewson | Mar. 8, 1910 |
| 1,188,734 | Clement | June 27, 1916 |
| 1,222,181 | Carmen | Apr. 10, 1917 |
| 1,377,092 | Phaneuf | May 3, 1921 |
| 1,483,777 | Callahan | Feb. 12, 1924 |
| 1,554,365 | Parker et al. | Sept. 22, 1925 |
| 1,889,406 | Goldschmidt | Nov. 29, 1932 |
| 2,150,469 | Tozer et al. | Mar. 14, 1939 |
| 2,293,764 | Roeder | Aug. 25, 1942 |
| 2,511,643 | Lawrence | June 13, 1950 |
| 2,545,127 | Wnuk | Mar. 13, 1951 |

FOREIGN PATENTS

| Number | Country | Date |
|---|---|---|
| 676,852 | France | Nov. 29, 1929 |